(12) United States Patent
Choi et al.

(10) Patent No.: US 10,703,896 B2
(45) Date of Patent: Jul. 7, 2020

(54) TRANSPARENT THERMOPLASTIC RESIN AND METHOD OF PREPARING THE SAME

(71) Applicant: LG CHEM, LTD., Seoul (KR)

(72) Inventors: Jeong Su Choi, Daejeon (KR); Won Seok Lee, Daejeon (KR); Seok Goo Jang, Daejeon (KR); Roo Da Lee, Daejeon (KR); Sang Hoo Park, Daejeon (KR); Ho Hoon Kim, Daejeon (KR); Hyung Seop Shim, Daejeon (KR); Keun Hoon Yoo, Daejeon (KR); Hye Jeong Ok, Daejeon (KR)

(73) Assignee: LG CHEM, LTD., Seoul (KR)

( * ) Notice: Subject to any disclaimer, the term of this patent is extended or adjusted under 35 U.S.C. 154(b) by 64 days.

(21) Appl. No.: 15/779,815

(22) PCT Filed: Aug. 30, 2017

(86) PCT No.: PCT/KR2017/009480
§ 371 (c)(1),
(2) Date: May 29, 2018

(87) PCT Pub. No.: WO2018/048136
PCT Pub. Date: Mar. 15, 2018

(65) Prior Publication Data
US 2018/0371230 A1    Dec. 27, 2018

(30) Foreign Application Priority Data

Sep. 9, 2016   (KR) .................. 10-2016-0116474
Jul. 11, 2017  (KR) .................. 10-2017-0087868

(51) Int. Cl.
| | | |
|---|---|---|
| *C08L 51/04* | (2006.01) | |
| *C08F 279/02* | (2006.01) | |
| *C08L 33/12* | (2006.01) | |
| *C08F 6/00* | (2006.01) | |
| *C08F 6/22* | (2006.01) | |
| *C08F 220/14* | (2006.01) | |

(52) U.S. Cl.
CPC ............. *C08L 51/04* (2013.01); *C08F 6/003* (2013.01); *C08F 6/22* (2013.01); *C08F 220/14* (2013.01); *C08F 279/02* (2013.01); *C08L 33/12* (2013.01); *C08L 2201/10* (2013.01)

(58) Field of Classification Search
CPC .......... C08L 51/04; C08F 6/003; C08F 220/14
See application file for complete search history.

(56) References Cited

U.S. PATENT DOCUMENTS

| 4,767,833 A | 8/1988 | Yumoto et al. |
| 7,019,049 B1 * | 3/2006 | Yoo ................... C08F 279/02 523/201 |
| 2015/0005425 A1 * | 1/2015 | Ahn .................... C08L 33/12 524/269 |
| 2016/0009907 A1 | 1/2016 | Naito et al. |

FOREIGN PATENT DOCUMENTS

| CN | 1372579 A | 10/2002 |
| CN | 101223233 A | 7/2008 |
| EP | 0703252 B1 | 12/2001 |
| JP | 8199008 A | 8/1996 |
| JP | 11147020 A | 6/1999 |
| JP | 2000186181 A | 7/2000 |
| KR | 1020130046162 A | 5/2013 |
| KR | 1020140018640 A | 2/2014 |
| KR | 10-1489558 * | 2/2015 |
| KR | 1020160068295 A | 6/2016 |

OTHER PUBLICATIONS

Translation of KR 101489558 (Year: 2015).*
International Search Report for PCT/KR2017/009480 dated Nov. 30, 2017.
Office Action dated Dec. 30, 2019 issued in related Chinese application No. 201780004697.1.
Extended European Search Report for EP Application No. 17849020.7, dated Dec. 7, 2018.

* cited by examiner

*Primary Examiner* — Robert C Boyle

(57) ABSTRACT

The present disclosure relates to a transparent thermoplastic resin and a method of preparing the same. More particularly, the present disclosure provides a transparent thermoplastic resin that provides superior transparency without generation of flow marks on a surface, and does not exhibit cracks or a whitening phenomenon during processing due to superior whitening resistance, particularly superior whitening resistance at low temperature, a method of preparing the transparent thermoplastic resin, and the like.

13 Claims, 1 Drawing Sheet

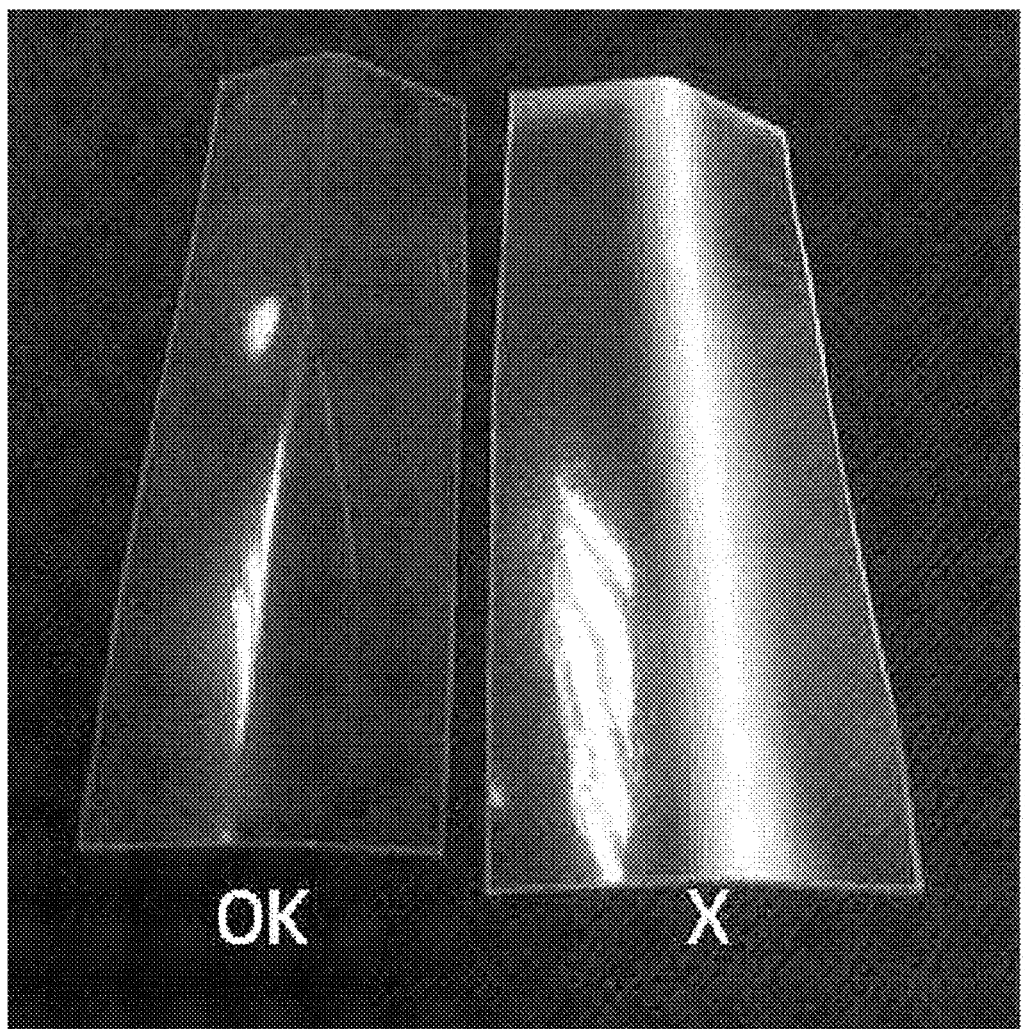

TRANSPARENT THERMOPLASTIC RESIN AND METHOD OF PREPARING THE SAME

CROSS-REFERENCE TO RELATED APPLICATION(S)

This application is a U.S. National Stage of PCT/KR2017/009480 filed Aug. 30, 2017, which claims the priority benefit of Korean Patent Application No. 10-2016-0116474, filed on Sep. 09, 2016, and Korean Patent Application No. 10-2017-0087868, filed on Jul. 11, 2017, in the Korean Intellectual Property Office, the disclosures of which are incorporated herein by reference.

TECHNICAL FIELD

The present disclosure relates to a transparent thermoplastic resin and a method of preparing the transparent thermoplastic resin. More particularly, the present disclosure relates to a transparent thermoplastic resin that provides superior transparency without generation of flow marks on a surface, and does not exhibit cracks or a whitening phenomenon during processing due to superior whitening resistance, particularly superior whitening resistance at low temperature, and a method of preparing the transparent thermoplastic resin.

BACKGROUND ART

Edges of furniture, which are corner parts of the furniture, are made of PVC resin, ABS resin, PET resin, or the like as a finishing material. In particular, an impact-resistant PMMA resin, in which the content of an impact modifier is high, is being used as a material of edges of high-grade furniture. In general, furniture edges are manufactured as follows: a resin for edges is extruded in a roll shape, various patterns are transferred thereonto, and the pattern-transferred resin is adhered to furniture, followed by finishing through cutting and trimming processes. However, furniture edges made of such an impact-resistant PMMA resin have a high defect ratio due to whitening and crack generation during the transfer, adhesion, cutting, or trimming process or during use. Accordingly, there is a need for development of a material that exhibits superior transparency and does not exhibit whitening and cracks during processes of manufacturing furniture edges or use thereof.

Meanwhile, an ABS resin achieves satisfactory balances among mechanical properties such as impact strength and fluidity, but is opaque. U.S. Pat. No. 4,767,833, Japanese Application Pub. No. hei 11-147020, European Patent No. 703,252, and Japanese Application Pub. No. hei 8-199008 disclose a method of adding an acrylic acid alkyl ester compound or a methacrylic acid alkyl ester compound to an ABS resin having superior impact resistance, chemical resistance, processability, and the like to provide transparency. However, when such a transparent thermoplastic resin is applied to furniture edges, a whitening phenomenon occurs during processing, cracks easily occur, and whitening occurs at low temperature. Accordingly, there are limitations in applying the ABS resin.

DISCLOSURE

Technical Problem

Therefore, the present invention has been made in view of the above problems, and it is one object of the present invention to provide a transparent thermoplastic resin that provides superior transparency without generation of flow marks on a surface, and does not exhibit cracks or a whitening phenomenon during processing due to superior whitening resistance, particularly superior whitening resistance at low temperature, and a method of preparing the transparent thermoplastic resin.

It is another object of the present invention to provide a molded article manufactured from the transparent thermoplastic resin.

It is yet another object of the present invention to provide furniture finished using the transparent thermoplastic resin.

The above and other objects can be accomplished by the present disclosure described below.

Technical Solution

To accomplish the objectives, the present disclosure provides a transparent thermoplastic resin including A) 45 to 75% by weight of a graft resin prepared by graft-polymerizing a-1) 40 to 65% by weight of a small-diameter conjugated diene rubber having an average particle diameter of 500 to 1,800 Å, a-2) 22 to 45% by weight of a (meth)acrylic acid alkyl ester compound, a-3) 7 to 18% by weight of an aromatic vinyl compound, and a-4) 0 to 10% by weight of a vinyl cyanide compound; and B) 25 to 55% by weight of a copolymer resin prepared by copolymerizing b-1) to 80% by weight of a (meth)acrylic acid alkyl ester compound, b-2) 15 to 35% by weight of an aromatic vinyl compound, and b-3) 0 to 10% by weight of a vinyl cyanide compound, wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.45 to 0.91.

The transparent thermoplastic resin includes, for example, 50 to 75% by weight of a graft resin prepared by graft-polymerizing A) a-1) 45 to 60% by weight of the small-diameter conjugated diene rubber having an average particle diameter of 500 to 1,800 Å, a-2) 25 to 45% by weight of the (meth)acrylic acid alkyl ester compound, a-3) 8 to 18% by weight of the aromatic vinyl compound, and a-4) 0 to 10% by weight of the vinyl cyanide compound; and B) 25 to 50% by weight of a copolymer resin prepared by copolymerizing b-1) 60 to 80% by weight of the (meth)acrylic acid alkyl ester compound, b-2) 15 to 35% by weight of the aromatic vinyl compound, and b-3) 1 to 10% by weight of the vinyl cyanide compound, wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.45 to 0.91. Within this range, transparency, whitening resistance, whitening resistance at low temperature, and crack resistance are excellent.

In another embodiment, the transparent thermoplastic resin includes 50 to 75% by weight of a graft resin prepared by graft-polymerizing A) a-1) 45 to 55% by weight of the small-diameter conjugated diene rubber having an average particle diameter of 500 to 1,800 Å, a-2) 30 to 40% by weight of the (meth)acrylic acid alkyl ester compound, a-3) 10 to 15% by weight of the aromatic vinyl compound, and a-4) 1 to 5% by weight of the vinyl cyanide compound; and B) 25 to 50% by weight of a copolymer resin prepared by copolymerizing b-1) 65 to 75% by weight of the (meth)acrylic acid alkyl ester compound, b-2) 20 to 30% by weight of the aromatic vinyl compound, and b-3) 2 to 8% by weight of the vinyl cyanide compound, wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.45 to 0.91. Within this range, transparency, whitening resistance, whitening resistance at low temperature, and crack resistance are excellent.

In another embodiment, the transparent thermoplastic resin includes A) 50 to 75% by weight of a graft resin prepared by graft-polymerizing a-1) 48 to 52% by weight of the small-diameter conjugated diene rubber having an average particle diameter of 500 to 1,800 Å, a-2) 32 to 38% by weight of the (meth)acrylic acid alkyl ester compound, a-3) 10 to 14% by weight of the aromatic vinyl compound, and a-4) 2 to 4% by weight of the vinyl cyanide compound; and B) 25 to 50% by weight of a copolymer resin prepared by copolymerizing b-1) 68 to 73% by weight of the (meth) acrylic acid alkyl ester compound, b-2) 22 to 27% by weight of the aromatic vinyl compound, and b-3) 3 to 6% by weight of the vinyl cyanide compound, wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.45 to 0.91. Within this range, transparency, whitening resistance, whitening resistance at low temperature, and crack resistance are excellent.

The small-diameter conjugated diene rubber has an average particle diameter of, for example, 500 to 1,500 Å, preferably 500 to 1,200 Å, more preferably 800 to 1,200 Å, most preferably 1,000 to 1,200 Å. Within this range, superior transparency and whitening resistance are exhibited.

A weight ratio of a-1) the small-diameter conjugated diene rubber to a-2) and b-1) the (meth)acrylic acid alkyl ester compounds (a-1/(a-2+b-1)) is, for example, 0.50 to 0.85, 0.55 to 0.8, 0.55 to 0.75, 0.57 to 0.70, or 0.59 to 0.65. Within this range, transparency, whitening resistance, whitening resistance at low temperature, and crack resistance are excellent.

The transparent thermoplastic resin may include, for example, A) 55 to 70% by weight of the graft resin and B) 30 to 45% by weight of the copolymer resin. Preferably, the transparent thermoplastic resin includes A) 60 to 65% by weight of the graft resin and B) 35 to 40% by weight of the copolymer resin. Within this range, excellent whitening resistance and crack resistance are exhibited.

A refractive index difference between A) the graft resin and B) the copolymer resin may be, for example, 0.01 or less, less than 0.01, 0.001 or less, or less than 0.001. Within this range, superior transparency is exhibited.

A) The graft resin may be, for example, a monomodal graft resin. In this case, superior transparency and whitening resistance are exhibited.

In the present disclosure, the monomodal graft resin refers to a graft resin including a rubber core that has one particle diameter distribution (single peak). Accordingly, graft resins prepared according to Preparation Examples I-1 to I-3, and I-5 to I-6 below correspond to monomodal (single peak) graft resins, and a graft resin prepared according to Preparation Example I-4 corresponds to a bimodal (double peaks) graft resin. In addition, the modals may be confirmed through a particle diameter distribution curve observed using an instrument for measuring an average particle diameter of a rubber latex such as Nicomp 380.

A) The graft resin might not include a large-diameter conjugated diene rubber having an average particle diameter of, for example, 2,000 Å or more, greater than 1800 Å, or 1,600 Å or more. In this case, whitening resistance is greatly improved.

A gel content in A) the graft resin may be, for example, 80% by weight or more, or 90% by weight or more.

A refractive index of A) the graft resin may be, for example, 1.516 or less. Within this range, superior transparency is exhibited.

A) The graft resin may be, for example, a graft resin coagulated with magnesium sulfate. In this case, superior heat resistance and crack resistance are exhibited.

A haze value of the transparent thermoplastic resin may be, for example, 0.8 or less, 0.7 or less, or 0.5 or less. Within this range, superior transparency is exhibited.

The transparent thermoplastic resin may be used, for example, as a finishing material for furniture.

The graft resin includes, for example, a core including a-1) the small-diameter conjugated diene rubber having an average particle diameter of 500 to 1,800 Å; and a shell enclosing the core and formed by graft-polymerizing a-2) the (meth)acrylic acid alkyl ester compound, a-3) the aromatic vinyl compound, and a-4) the vinyl cyanide compound, wherein a refractive index difference between the core and the shell is 0.01 or less, less than 0.01, 0.001 or less, or less than 0.001. Within this range, superior transparency is exhibited.

a-2) and b-1) The (meth)acrylic acid alkyl ester compounds may be, for example, methacrylate alkyl ester compounds. Preferably, each of a-2) and b-1) the (meth)acrylic acid alkyl ester compounds is methyl methacrylate. In this case, transparency, whitening resistance, whitening resistance at low temperature, and crack resistance are superior.

In addition, the present disclosure provides i) a step of preparing a graft resin by graft-polymerizing 40 to 65% by weight of a small-diameter conjugated diene rubber having an average particle diameter of 500 to 1,800 Å, 22 to 45% by weight of a (meth)acrylic acid alkyl ester compound, 7 to 18% by weight of an aromatic vinyl compound, and 0 to 10% by weight of a vinyl cyanide compound; and ii) a step of melt-kneading 25 to 55 parts by weight of a copolymer resin prepared by copolymerizing 45 to 75 parts by weight of the graft resin, 60 to 80% by weight of a (meth)acrylic acid alkyl ester compound, 15 to 35% by weight of an aromatic vinyl compound, and 0 to 10% by weight of a vinyl cyanide compound, thereby preparing a transparent thermoplastic resin, wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.45 to 0.91.

Step i) may include a step of coagulating with magnesium sulfate after terminating the graft-polymerizing.

The copolymer resin of step ii) may be prepared by bulk polymerization. In this case, a preparation process thereof is simple and economic feasibility is superior.

In addition, the present disclosure provides a molded article manufactured from the transparent thermoplastic resin.

The molded article may be, for example, a furniture finishing material, an artificial nail or a semiconductor carrier tape. Preferably, the molded article is a material for finishing furniture edges.

In addition, the present disclosure provides furniture finished using the transparent thermoplastic resin.

The present inventors have researched to improve transparency, whitening resistance, whitening resistance at low temperature, and crack resistance of a transparent thermoplastic resin. As a results, the present inventors confirmed that, when a composition and a content ratio are included in specific ranges, a predetermined small-diameter conjugated diene rubber is included in a specific content, and, particularly, a weight ratio of the small-diameter conjugated diene rubber to a (meth)acrylic acid alkyl ester compound is controlled in a specific range, transparency, whitening resistance, whitening resistance at low temperature, and crack resistance of a prepared transparent thermoplastic resin are greatly improved, thus completing the present invention.

Advantageous Effects

As apparent from the fore-going, the present invention advantageously provides a transparent thermoplastic resin that provides superior transparency without generation of flow marks on a surface, and does not exhibit cracks or a whitening phenomenon during processing due to superior whitening resistance, particularly superior whitening resistance at low temperature, a method of preparing the transparent thermoplastic resin, a molded article manufactured from the transparent thermoplastic resin, and the like.

DESCRIPTION OF DRAWINGS

FIG. 1 illustrates photographs of a whitened sheet (marked by X) and a non-whitened sheet (marked by OK) which have been subjected to a whitening test.

BEST MODE

Hereinafter, the present disclosure is described in detail.
I) Method of Preparing Graft Resin (A)

A graft resin (A) is prepared, for example, by graft-copolymerizing a conjugated diene-based rubber latex of a weight average rubber particle size of 500 to 1,800 Å with a (meth)acrylic acid alkyl ester compound, an aromatic vinyl compound, and a vinyl cyanide compound.

As a more particular example, the graft resin (A) may be prepared by graft-copolymerizing (a) 40 to 65 parts by weight of a conjugated diene rubber latex having a weight average rubber particle size of 500 to 1,800 Å (based on a solid) with (b) 22 to 45 parts by weight of a (meth)acrylic acid alkyl ester compound, (c) 7 to 18 parts by weight of an aromatic vinyl compound, and (d) 0 to 10 parts by weight of a vinyl cyanide compound based on 100 parts by weight of a total of the graft resin (A).

In the present disclosure, the (meth)acrylic acid alkyl ester compound includes both a methacrylic acid alkyl ester compound and an acrylic acid alkyl ester compound unless specified otherwise.

The conjugated diene rubber is a polymer of a conjugated diene compound having a structure wherein double bonds and single bonds are alternately arranged and, as needed, may further include a comonomer.

The conjugated diene rubber may be, for example, a butadiene polymer, a butadiene-styrene copolymer (SBR), a butadiene-acrylonitrile copolymer (NBR), an ethylene-propylene-diene copolymer (EPDM), or a polymer derived therefrom. More preferably, the conjugated diene rubber may be a butadiene polymer or a butadiene-styrene copolymer. In this case, superior transparency is exhibited.

An average particle diameter of the conjugated diene rubber latex is preferably 500 to 1,800 Å. When the average particle diameter is less than 500 Å, a large amount of emulsifier is required. In addition, transparency may be decreased due to the remainder of an emulsifier. On the other hand, when the average particle diameter is greater than 1,800 Å, a whitening phenomenon may occur.

In addition, the conjugated diene rubber latex may be included in an amount of 40 to 65 parts by weight (based on a solid). When the content of the conjugated diene rubber latex is less than 40 parts by weight, crack generation possibility during processing of furniture edges is high. On the other hand, the content of the conjugated diene rubber latex is greater than 65 parts by weight, complete grafting does not occur during polymerization, thereby causing decrease in transparency.

A method of preparing the conjugated diene rubber latex is not specifically limited so long as it is a general method of preparing a small-diameter conjugated diene rubber latex. For example, the method may be performed by adding additives such as a conjugated diene-based compound, ion exchanged water, an emulsifier, a polymerization initiator, an electrolyte, and, as needed, a molecular weight regulator, followed by emulsion polymerization.

The (meth)acrylic acid alkyl ester compound may be, for example, one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester. Particularly preferably, the (meth)acrylic acid alkyl ester compound may be methyl methacrylate.

In addition, the (meth)acrylic acid alkyl ester compound may be included in an amount of, for example, 22 to 45 parts by weight.

The aromatic vinyl compound may be, for example, one or more selected from the group consisting of styrene, α-methyl styrene, p-methyl styrene, and vinyl toluene. Particularly preferably, the aromatic vinyl compound may be styrene.

In addition, the aromatic vinyl compound may be included in an amount of, for example, 7 to 18 parts by weight.

The vinyl cyanide compound may be, for example, acrylonitrile, methacrylonitrile, or a mixture thereof. The vinyl cyanide compound is preferably used in an amount of 0 to 10 parts by weight. When the vinyl cyanide compound is greater than 10 parts by weight, the color of a resin turns yellow and thus does not satisfy consumer's demand for natural color. In addition, a large amount of solid (coagulum) is generated during graft polymerization, which makes it is difficult to apply the same for resin production.

The transparency of the graft resin (A) of the present disclosure is determined according to the refractive index of a used rubber and the refractive index of a polymer grafted to the rubber. The refractive index of the grafted polymer is adjusted depending upon a mix ratio of monomers. That is, since the refractive index of the conjugated diene rubber latex should be matched to the refractive index of a total of remaining ingredients, a mixing ratio of monomers is very important. As a result, to provide transparency, the refractive index of a conjugated diene compound used as a seed or core should be similar to the refractive index of a total of ingredients grafted to the conjugated diene compound. Preferably, the refractive index of the conjugated diene compound coincides with the refractive index of a total of ingredients grafted thereto. In conclusion, a difference between the refractive index of the conjugated diene rubber latex and the refractive index of a total of compounds grafted thereto is preferably less than 0.01.

The refractive indexes of the polymers of the monomers included in the transparent thermoplastic resin of the present disclosure are as follows: butadiene: 1.518, methyl methacrylate: 1.49, styrene: 1.59, and acrylonitrile: 1.52.

In addition, the refractive index of a mixture or copolymer of the compounds graft-polymerized to main-chain conjugated diene rubber of the transparent thermoplastic resin may be calculated as follows:

$$RI = Wti * RIi$$

Wti=Weight fraction of each ingredient in copolymer (%)
RIi=Refractive index of polymer of each ingredient in copolymer The graft polymerization is not specifically limited so long as it is a general graft polymerization method. For example, using an emulsion graft polymerization method, a (meth)acrylic acid alkyl ester compound, a vinyl cyanide compound, an aromatic vinyl compound, an emulsifier, a polymerization initiator, and, as needed, additives such as a molecular weight regulator may be added to the conjugated diene rubber latex together or respectively before or after polymerization initiation. Here, a portion or the entirety of the substances may be added portionwise, continuously, or dropwise.

The emulsifier used in the emulsion polymerization may be, for example, alkylaryl sulfonate, alkali methyl alkyl sulfate, a sulfonated alkyl ester salt, alkyl(alkenyl) carboxylate, alkyl(alkenyl) succinate, rosinate, oleate, a fatty acid salt, a toll oil fatty acid salt, or the like. These substances may be used alone or as a mixture of two or more thereof.

After the emulsion polymerization, the graft copolymer in emulsified state may be coagulated with a coagulant. As the coagulant, one or more of salt coagulants, such as magnesium sulfate, calcium chloride, and sodium chloride, or acidic coagulants, such as sulfuric acid, hydrochloric acid, formic acid, and acetic acid, may be used. After the coagulation, the graft copolymer is dehydrated and dried and prepared in a powder form.

II) Method of Preparing MSAN Copolymer Resin (B)

The copolymer resin (B) of the present disclosure is a copolymer resin composed of, for example, 60 to 80 parts by weight of a (meth)acrylic acid alkyl ester compound (monomer), 15 to 35 parts by weight of an aromatic vinyl compound (monomer), and 0 to 10 parts by weight of a vinyl cyanide compound (monomer). Preferably, the refractive index of the copolymer resin (B) should be the same as or similar to that of the graft resin prepared in step I).

In the present disclosure, the method of preparing the MSAN copolymer resin (B) is not specifically limited and is suitably a suspension polymerization method or a bulk polymerization method. Particularly, a continuous bulk polymerization method is the best method in terms of manufacturing cost. When the vinyl cyanide compound is used in an amount of greater than 10 parts by weight, there is a problem that the color turns yellow.

Preferably, the vinyl cyanide compound is, for example, acrylonitrile, methacrylonitrile, or a mixture thereof. As the (meth)acrylic acid alkyl ester compound, for example, (meth)acrylic acid methyl ester, (meth)acrylic acid ethyl ester, (meth)acrylic acid propyl ester, (meth)acrylic acid 2-ethylhexyl ester, (meth)acrylic acid decyl ester, (meth) acrylic acid lauryl ester, or the like may be used. Thereamong, methyl methacrylate is most preferred.

As the aromatic vinyl compound, for example, styrene, α-methyl styrene, p-methyl styrene, vinyl toluene, or the like may be used. Particularly, styrene is preferred.

A mix ratio of the monomers is very important to obtain a resin having transparency. A refractive index depends upon the mix ratio. That is, preferably, the refractive index of the graft resin (A) should be similar to that of the MSAN copolymer resin (B). More preferably, the refractive index of the graft resin (A) coincides with that of the MSAN copolymer resin (B). When a difference between the refractive index of the graft resin (A) and the refractive index of the copolymer resin (B) is greater than 0.01, transparency is decreased.

The refractive indexes of respective ingredients (refractive index of polymers after polymerization) are as follows: methyl methacrylate: 1.49, styrene: 1.592, and acrylonitrile: 1.52. The refractive indexes of the copolymerized polymers may be calculated as follows:

$$RI = Wti * RIi$$

Wti=Weight fraction of each ingredient in copolymer (%)
RIi=Refractive index of polymer of each ingredient in copolymer A method of preparing the copolymer resin is not specifically limited so long as it is a method generally used in the art. For example, the method may be a bulk polymerization method wherein an organic solvent, as a reactive medium, and, as needed, additives such as a molecular weight regulator and a polymerization initiator are added to a monomer mixture and polymerization is performed.

III) Step of Kneading Graft Resin (A) and Copolymer Resin (B)

For example, the graft resin (A) and the MSAN copolymer resin (B) are mixed and melt-kneading, thereby preparing a transparent thermoplastic resin.

A total composition of the prepared transparent thermoplastic resin is, for example, as follows: 25 to 35% by weight of conjugated diene rubber latex having a weight average rubber particle size of 500 to 1,800 Å; 28 to 57% by weight of a (meth)acrylic acid alkyl ester compound; 18 to 38% by weight of an aromatic vinyl compound; and 0 to 10% by weight of a vinyl cyanide compound.

When the content of the conjugated diene rubber is less than 25% by weight, cracks may be generated during processing of furniture edges. When the content of the rubber is greater than 35% by weight, flow marks are formed on a surface, whereby transparency is decreased.

In addition, when the (meth)acrylic acid alkyl ester compound and the aromatic vinyl compound are outside the ranges, the refractive indexes thereof do not coincide with that of the conjugated diene rubber latex, whereby transparency is decreased.

In addition, when the content of the vinyl cyanide compound is greater than 10% by weight, the color turns yellow, which are not suitable for the objectives of the present invention.

When the graft resin (A) and the copolymer resin (B) are mixed or kneaded, additives such as a heat stabilizer, a UV stabilizer, an antioxidant, and a lubricant may be included within a range within which the properties of the transparent thermoplastic resin of the present disclosure are not affected.

The additives may be included, for example, in an amount of 0.01 to 5 parts by weight, 0.01 to 3 parts by weight, or 0.5 to 1 parts by weight based on 100 parts by weight of the sum of the graft resin (A) and the copolymer resin (B). Within this range, intrinsic characteristics of the additives may be exhibited without affecting the properties of the transparent thermoplastic resin.

After mixing of the graft resin (A) and the copolymer resin (B), for example, the resultant mixture is uniformly dispersed and extruded by means of a single-screw extruder, a twin-screw extruder or a Banbury mixer. The extruded product is passed through a water bath and then cut, thereby preparing a pellet-type transparent thermoplastic resin.

The pellet-type transparent thermoplastic resin may be manufactured into, for example, an injection-molded article by means of an injection machine.

The injection-molded article may be, for example, a furniture finishing material, an artificial nail, or a semiconductor carrier tape (carrier tape). Preferably, the injection-molded article may be a material for finishing furniture edges.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Preparation Example I-1

Preparation of Graft Resin (A-1)

100 parts by weight of ion exchanged water, 1.0 part by weight of sodium oleate as an emulsifier, 35 parts by weight of methyl methacrylate, 12 parts by weight of styrene, 3 parts by weight of acrylonitrile, 0.5 parts by weight of tertiary dodecyl mercaptan, 0.05 parts by weight of ethylenediamine tetraacetic acid, 0.1 parts by weight of sodium formaldehyde sulfoxylate, 0.001 parts by weight of ferrous sulfide, and 0.2 parts by weight of tertiary butyl hydroperoxide were continuously added to 50 parts by weight of a polytbutadiene rubber latex having a gel content of 90% and an average particle diameter of 1,200 Å prepared by emulsion polymerization (based on a solid) at 75° C. over a period of five hours such that reaction was performed. After the reaction, temperature was elevated to 80° C. and then aging was performed over a period of one hour, followed by terminating the reaction. As a result, a graft resin latex was prepared. Subsequently, the latex was coagulated with 2 parts by weight of magnesium sulfate as a coagulant and then dried and dehydrated. As a result, a powder-type graft resin was obtained. The refractive index of the obtained graft resin was 1.516.

Preparation Example I-2

Preparation of Graft Resin (A-2)

150 parts by weight of ion exchanged water, 1.0 part by weight of sodium oleate as an emulsifier, 26 parts by weight of methyl methacrylate, 9 parts by weight of styrene, 2 parts by weight of acrylonitrile, 0.4 parts by weight of tertiary dodecyl mercaptan, 0.05 parts by weight of ethylenediamine tetraacetic acid, 0.1 parts by weight of sodium formaldehyde sulfoxylate, 0.001 parts by weight of ferrous sulfide, and 0.3 parts by weight of tertiary butyl hydroperoxide were continuously added to 63 parts by weight of a polytbutadiene rubber latex having a gel content of 90% and an average particle diameter of 500 Å prepared by emulsion polymerization (based on a solid) at 70° C. over a period of five hours such that reaction was performed. After the reaction, temperature was elevated to 80° C. and then aging was performed over a period of one hour, followed by terminating the reaction. As a result, a graft resin latex was prepared. Subsequently, the latex was coagulated with 2 parts by weight of magnesium sulfate as a coagulant and then dried and dehydrated. As a result, a powder-type graft resin was obtained. The refractive index of the obtained graft resin was 1.516.

Preparation Example I-3

Preparation of Graft Resin (A-3)

150 parts by weight of ion exchanged water, 1.0 part by weight of sodium oleate as an emulsifier, 41 parts by weight of methyl methacrylate, 14 parts by weight of styrene, 3 parts by weight of acrylonitrile, 0.5 parts by weight of tertiary dodecyl mercaptan, 0.05 parts by weight of ethylenediamine tetraacetic acid, 0.1 parts by weight of sodium formaldehyde sulfoxylate, 0.001 parts by weight of ferrous sulfide, and 0.3 parts by weight of tertiary butyl hydroperoxide were continuously added to 42 parts by weight of a polytbutadiene rubber latex having a gel content of 90% and an average particle diameter of 1,000 Å prepared by emulsion polymerization (based on a solid) at 75° C. over a period of five hours such that reaction was performed. After the reaction, temperature was elevated to 80° C. and then aging was performed over a period of one hour, followed by terminating the reaction. As a result, a graft resin latex was prepared. Subsequently, the latex was coagulated with 2 parts by weight of magnesium sulfate as a coagulant and then dried and dehydrated. As a result, a powder-type graft resin was obtained. The refractive index of the obtained graft resin was 1.516.

Preparation Example I-4

Preparation of Graft Resin (A-4)

A graft resin was prepared in the same manner as in Preparation Example I-1, except that 25 parts by weight of the polytbutadiene rubber latex having a gel content of 90% and an average particle diameter of 1,200 Å (based on a solid) and 25 parts by weight of a polytbutadiene rubber latex having a gel content of 70% and an average particle diameter of 3,000 Å (based on a solid) were used instead of the polytbutadiene rubber latex having a gel content of 90% and an average particle diameter of 1,200 Å. As a result, the refractive index of an obtained graft resin was 1.516.

Preparation Example I-5

Preparation of Graft Resin (A-5)

A graft resin was prepared in the same manner as in Preparation Example I-1, except that 50 parts by weight of a polytbutadiene rubber latex having a gel content of 70% and an average particle diameter of 3,000 Å (based on a solid) were used instead of the polytbutadiene rubber latex having a gel content of 90% and an average particle diameter of 1,200 Å. As a result, the refractive index of an obtained graft resin was 1.516.

Preparation Example I-6

Preparation of Graft Resin (A-6)

A graft resin was prepared in the same manner as in Preparation Example I-1, except that the methyl methacrylate was used in an amount of 27.8 parts by weight instead of 35 parts by weight and styrene was used in an amount of 19.2 parts by weight instead of 12 parts by weight. As a result, the refractive index of an obtained graft resin was 1.53.

Preparation Example I-7

Preparation of Graft Resin (A-7)

A graft resin was prepared in the same manner as in Preparation Example I-1, except that 50 parts by weight of a polytbutadiene rubber latex having gel content of 80% and an average particle diameter of 2000 Å (based on a solid) were used instead of the polytbutadiene rubber latex having a gel content of 90% and an average particle diameter of 1,200 Å. As a result, the refractive index of an obtained graft resin was 1.516.

Preparation Example II-1

Preparation of MSAN Copolymer Resin (B-1)

A mixture of 30 parts by weight of toluene, as a solvent, and 0.15 parts by weight of ditertiary dodecyl mercaptan, as a molecular weight regulator, was continuously added to 70.4 parts by weight of methyl methacrylate, 24.6 parts by weight of styrene, 5 parts by weight of acrylonitrile over a period of an average reaction time of three hours while maintaining reaction temperature at 148° C. Subsequently, a polymer solution discharged from the reactor was heated in a preliminary heating tank, and unreactive monomers were volatilized therefrom in a volatilization tank. Subsequently, a pellet-type copolymer resin was prepared by means of a polymer transfer pump and an extruder while maintaining the temperature of the polymer at 210° C. As a result, the refractive index of a prepared MSAN copolymer resin was 1.516.

Preparation Example II-2

Preparation of MSAN Copolymer Resin (B-2)

An MSAN copolymer resin was prepared in the same manner as in Preparation Example II-1, except that 45 parts by weight of methyl methacrylate were used instead of 70.4 parts by weight of methyl methacrylate and 50 parts by weight of styrene were used instead of 24.6 parts by weight of styrene. As a result, the refractive index of a prepared MSAN copolymer resin was 1.542.

Preparation Example II-3

SAN Copolymer Resin (B-3)

To compare the MSAN copolymer resin prepared in each of Preparation Examples II-1 and II-2 with a styrene-acrylonitrile (SAN) copolymer resin, 82TR (refractive index=1.56) manufactured by LG Chemistry, as a commercially available SAN copolymer resin, was used.

Preparation Example II-4

MS Copolymer Resin (B-4)

To compare the MSAN copolymer resin prepared in each of Preparation Examples II-1 and II-2 with a methyl metacrylate-styrene (MS) copolymer resin, MS200 (refractive index=1.565) manufactured by Nippon Steel Chemical, as a commercially available MS copolymer resin, was used.

Examples 1 to 4 and Comparative Examples 1 to 13

The graft resin (A) and copolymer resin (B) prepared in each of the preparation examples were mixed as in Table 1 below, and 0.3 parts by weight of a lubricant and 0.2 parts by weight of an antioxidant were added thereto, followed by preparing into a pellet shape by means of a twin-screw extruder at a cylinder temperature of 220° C. The prepared pellet was injection-molded, thereby manufacturing a specimen.

Test Examples

The characteristics of the transparent thermoplastic resin prepared in each of Examples 1 to 4 and Comparative Examples 1 to 13 were measured according to the following methods. Results are summarized in Table 2 below Transparency (haze Value): The transparency of a specimen having a thickness of 3 mm was measured according to ASTM1003.

Whitening characteristic at low temperature: A transparency specimen having a thickness of 3 mm was stored in a low-temperature chamber at −50° C. for four hours and then change in transparency was observed. In accordance with Equation 1 below, a product having a transparency difference of 1 or more is considered to exhibit whitening at low temperature.

$$\text{Haze} = \text{Haze(after storing at low temperature)} - \text{haze (stored at room temperature)} \quad [\text{Equation 1}]$$

Whitening characteristic: A prepared pellet was fed into a sheet extruder, thereby manufacturing a sheet having a thickness of 0.3 mm. A manufactured sheet was bent by hand, and whether whitening occurred was observed with the naked eye. Here, X was indicated when whitening occurred, and OX was indicated when whitening did not occur (see FIG. 1 below).

Crack resistance (cracks exhibited): An extruded sheet was bent by hand, and whether cracks or breakage occurred was observed with the naked eye. This crack resistance was evaluated five times, and the frequency of breakage or cracks was marked.

Weight average particle diameter: A weight average particle diameter of a rubber latex to be used for polymerization was observed by means of Nicomp 380.

Gel content: A rubber latex was solidified using a dilute acid or a metal salt and then washed, followed by drying in a 60° C. vacuum over for 24 hours. An obtained rubber lump was cut into small pieces with scissors, and then 1 g of a rubber piece was placed in 100 g of toluene and stored in a dark room at room temperature for 48 hours, followed by separating into sol and gel. A gel content was measured according to Equation 2 below.

$$\text{Gel content (\%)} = \text{Weight of insoluble substance (gel)/weight of sample} * 100 \quad [\text{Equation 2}]$$

Refractive index measurement: To investigate the refractive index of each copolymer, a specimen was sliced to a thickness of about 0.2 mm by means of a hot press, and then irradiated with light of 450 nm at 25° C. means of with an Abbe refractometer.

TABLE 1

| | Graft copolymer (A) | | | | | | | MSAN (B) | | | |
|---|---|---|---|---|---|---|---|---|---|---|---|
| | A-1 | A-2 | A-3 | A-4 | A-5 | A-6 | A-7 | B-1 | B-2 | B-3 | B-4 |
| Example 1 | 60 | | | | | | | 40 | | | |
| Example 2 | 65 | | | | | | | 35 | | | |
| Example 3 | | 50 | | | | | | 50 | | | |
| Example 4 | | | 70 | | | | | 30 | | | |
| Comparative Example 1 | | | | 55 | | | | 45 | | | |
| Comparative Example 2 | | | | | 60 | | | 40 | | | |
| Comparative Example 3 | | | | | | 65 | | 35 | | | |
| Comparative Example 4 | 30 | | | | | | | 70 | | | |
| Comparative Example 5 | 30 | | | 30 | | | | 40 | | | |
| Comparative Example 6 | 60 | | | | | | | | 40 | | |
| Comparative Example 7 | | | | | 25 | | | 75 | | | |
| Comparative Example 8 | | | 40 | | | | | 60 | | | |
| Comparative Example 9 | 55 | | | | | | | | | 45 | |
| Comparative Example 10 | 55 | | | | | | | | | | 45 |
| Comparative Example 11 | 40 | | | | | | | 60 | | | |
| Comparative Example 12 | 80 | | | | | | | 20 | | | |
| Comparative Example 13 | | | | | | | 60 | 40 | | | |

TABLE 2

| | Transparency (Haze) | Whitening at low temperature (haze) | Whitening characteristic | Crack occurrence |
|---|---|---|---|---|
| Example 1 | 0.5 | 0.3 | OK | 0 |
| Example 2 | 0.7 | 0.2 | OK | 0 |
| Example 3 | 0.6 | 0.3 | OK | |
| Example 4 | 0.6 | 0.4 | OK | |
| Comparative Example 1 | 2.6 | 0.5 | X | 0 |
| Comparative Example 2 | 2.1 | 15.2 | X | 0 |
| Comparative Example 3 | 35.2 | 0.2 | OK | 0 |
| Comparative Example 4 | 0.5 | 0.3 | OK | 3 |
| Comparative Example 5 | 1.1 | 0.5 | X | 0 |
| Comparative Example 6 | 20.1 | 0.3 | OK | 0 |
| Comparative Example 7 | 1.8 | >50 | X | 5 |
| Comparative Example 8 | 0.6 | 0.5 | OK | 3 |
| Comparative Example 9 | >50 | — | — | — |
| Comparative Example 10 | >50 | — | — | — |
| Comparative Example 11 | 0.6 | 0.3 | OK | 2 |
| Comparative Example 12 | 1.1 (flow marks generated) | 0.2 | OK | 2 |
| Comparative Example 13 | 1.1 | 3.0 | X | 0 |

As shown in Table 2, it can be confirmed that the transparent thermoplastic resins (Examples 1 and 2) of the present disclosure exhibited superior transparency, excellent whitening resistance (see a left photograph of FIG. 1 below), and excellent crack resistance.

However, when the refractive index of the conjugated diene rubber was different from that of the copolymer grafted thereto or the refractive index of the graft resin (A) was different from that of the copolymer resin (B) as in Comparative Examples 3 and 6, haze rapidly increased, and thus, transparency was greatly decreased.

In addition, when the large-diameter conjugated diene rubber having an average particle diameter of 3,000 Å was used as in Comparative Examples 2 and 7 or the large-diameter conjugated diene rubber having an average particle diameter of 2,000 Å was used as in Comparative Example 13, whitening at low temperature was poor and whitening occurred as illustrated in a right photograph (marked with X) of FIG. 1 below when an edge roll was bent.

In addition, when the bimodal graft resin including the conjugated diene rubber having an average particle diameter of 1,200 Å and the conjugated diene rubber having an average particle diameter of 3,000 Å was included when as in Comparative Examples 1 and 3, whitening occurred as illustrated in a right photograph (marked with X) of FIG. 1 below when an edge roll was bent.

Further, when a ratio of the content of the conjugated diene rubber of the present disclosure to the content of the (meth)acrylic acid alkyl ester compounds (a-1/(a-2+b-1)) was outside a range of 0.45 to 0.91 as in Comparative Examples 4, 7, 8, 11, and 12, an edge roll was broken or cracked when it was bent.

Finally, it was confirmed that, when the SAN copolymer resin or the MS copolymer resin was used instead of the MSAN copolymer resin (Comparative Examples 9 and 10), a refractive index difference between the copolymer resin (B) and the graft resin (A) was large, whereby an almost opaque product was manufactured. Accordingly, other properties were not evaluated.

The invention claimed is:

1. A transparent thermoplastic resin, comprising:
   A) 45 to 75% by weight of a graft resin prepared by graft-polymerizing a-1) 40 to 65% by weight of a small-diameter conjugated diene rubber having an average particle diameter of 500 to 1,800 Å, a-2) 22 to 45% by weight of a (meth)acrylic acid alkyl ester compound, a-3) 7 to 18% by weight of an aromatic vinyl compound, and a-4) 0 to 10% by weight of a vinyl cyanide compound; and
   B) 25 to 55% by weight of a copolymer resin prepared by copolymerizing b-1) 60 to 80% by weight of a (meth) acrylic acid alkyl ester compound, b-2) 15 to 35% by weight of an aromatic vinyl compound, and b-3) 0 to 10% by weight of a vinyl cyanide compound,
   wherein a weight ratio of a-1) the small-diameter conjugated diene rubber having an average particle diameter of 500 to 1,800 Å to a-2) and b-1) the (meth)acrylic acid alkyl ester compounds (a-1/(a-2+b-1)) is 0.61 to 0.70.

2. The transparent thermoplastic resin according to claim 1, wherein a refractive index difference between A) the graft resin and B) the copolymer resin is 0.01 or less.

3. The transparent thermoplastic resin according to claim 1, wherein A) the graft resin is a monomodal graft resin.

4. The transparent thermoplastic resin according to claim 1, wherein A) the graft resin excludes a large-diameter conjugated diene rubber having an average particle diameter 2,000 Å or more.

5. The transparent thermoplastic resin according to claim 1, wherein a gel content in A) the graft resin is 80% by weight or more.

6. The transparent thermoplastic resin according to claim 1, wherein A) the graft resin has a refractive index of 1.516 or less.

7. The transparent thermoplastic resin according to claim 1, wherein the transparent thermoplastic resin has a haze value of 0.8 or less.

8. The transparent thermoplastic resin according to claim 1, wherein the transparent thermoplastic resin is used as a finishing material for furniture.

9. The transparent thermoplastic resin according to claim 1, wherein the graft resin comprises a core comprising a-1) the small-diameter conjugated diene rubber having an average particle diameter of 500 to 1,800 Å; and a shell enclosing the core and formed by graft-polymerizing a-2) the (meth)acrylic acid alkyl ester compound, a-3) the aromatic vinyl compound, and a-4) the vinyl cyanide compound, wherein a refractive index difference between the core and the shell is 0.01 or less.

10. The transparent thermoplastic resin according to claim 1, wherein a-2) and b-1) the (meth)acrylic acid alkyl ester compounds are methacrylate alkyl ester compounds.

11. A molded article manufactured from the transparent thermoplastic resin according to claim 1.

12. The molded article according to claim 11, wherein the molded article is a furniture finishing material, an artificial nail, or a semiconductor carrier tape.

13. Furniture finished with the transparent thermoplastic resin according to claim 1.

* * * * *